(12) United States Patent
Kim

(10) Patent No.: US 7,187,539 B2
(45) Date of Patent: Mar. 6, 2007

(54) HINGE ASSEMBLY IN PORTABLE COMPUTER

(75) Inventor: Jun-Hong Kim, Hwaseong (KR)

(73) Assignee: LG Electronics Inc., Seoul (KR)

( * ) Notice: Subject to any disclaimer, the term of this patent is extended or adjusted under 35 U.S.C. 154(b) by 104 days.

(21) Appl. No.: 10/970,012

(22) Filed: Oct. 22, 2004

(65) Prior Publication Data

US 2006/0002068 A1    Jan. 5, 2006

(30) Foreign Application Priority Data

Jun. 30, 2004    (KR) ...................... 10-2004-0050735

(51) Int. Cl.
*G06F 1/16*    (2006.01)
*E05C 17/64*   (2006.01)
(52) U.S. Cl. ........................ 361/681; 361/683; 16/319; 16/342
(58) Field of Classification Search ................ 361/683, 361/680, 681; 16/342, 319
See application file for complete search history.

(56) References Cited

U.S. PATENT DOCUMENTS 6,612,668 B2 *   9/2003   Doan ...................... 312/223.2

2005/0122671 A1 *   6/2005   Homer ...................... 361/681
2005/0248915 A1 *  11/2005   Tanaka et al. ............. 361/683

* cited by examiner

*Primary Examiner*—Hung V. Ngo
(74) *Attorney, Agent, or Firm*—Fleshner & Kim, LLP

(57) ABSTRACT

A hinge assembly, a portable computer having the same and methods thereof can include a latching function. The hinge assembly includes a latching projection and latching groove coupled, respectively, to a main unit and a display unit of a portable computer. The latching projection and latching groove can slidingly engage with each other to hold the portable computer in a prescribed position (e.g., closed) unless a force greater than a prescribed force is applied. The hinge assembly includes a first mounting bracket; a first cam moving integrally with the first mounting bracket; a second mounting bracket fixed to a portion that can rotate relatively to the portion to which the first mounting bracket is fixed; and a second cam coupled to the second mounting bracket that rotates relatively with respect to the first cam while being in contact with and rubbed against the first cam. Thus, it is not necessary to separately provide a latch device for engagement between the display and the main body.

24 Claims, 6 Drawing Sheets

HINGE ASSEMBLY IN PORTABLE COMPUTER

BACKGROUND OF THE INVENTION

1. Field of the Invention

The present invention relates to a hinge assembly, and more particularly, to a hinge assembly that causes two parts to pivot with respect to each other.

2. Background of the Related Art

FIG. 1 is a perspective view of a conventional portable computer. The portable computer includes a main body 1 of a substantially flat rectangular shape and a display 3 that pivots about a hinge 5 at a rear end of the main body 1.

The display 3, which is formed in a plate shape corresponding to the main body 1, is folded and seated onto an upper face of the main body 1 when closed for safekeeping or carrying the portable computer. As shown in FIG. 1, the display 3 is unfolded with respect to the main body 1 when in use.

Inside the main body 1 is a main board of the portable computer, and the upper face of the main body 1 is provided with a keyboard 7. The keyboard 7 is a portion through which desired information is input as a user presses keys. The display 3 has a liquid crystal panel 9 that displays various information.

When the display 3 and the main body 1 are folded on each other to be kept safe or carried, latch devices 10 engage the display 3 and the main body 1 to each other. The latch devices 10 are provided at corresponding portions of front ends of a rear case 11 and a front case 12, which form an appearance of the display 3. The number of the latch devices 10 may be properly determined according to a width of the display 3.

The rear case 11 forms a rear face of the display 3, and the front case 12 forms a frame of a front edge of the display 3. The front case 12, which is formed in a rectangular frame shape, functions to seal and support an edge of the liquid crystal panel 9 of the display 3.

A space formed between the rear case 11 and the front case 12 is provided with latches and the like forming the latch devices 10. That is, the latches (not shown) are provided in the space formed between the rear case 11 and the front case 12 so that hooks 14 project outward from a front end of the front case 12 toward a front face. The hooks 14 are selectively hooked into catching grooves 1' formed at a front end of the upper face of the main body 1. An operating knob 13 for operating the hook 14 is exposed at a side face of the front end of the display 3.

As described above, the prior art has various disadvantages. In the prior art, the latch devices 10 are used for a selective engagement between the main body 1 and the display 3. In the latch device 10, the hooks 14 should be projected toward a front face of the display 3, and the catching grooves 1' into which the hooks 14 are hooked should also be formed at the main body 1. Therefore, there is a problem in that depressed portions (e.g., the catching grooves 1') and projected portions (e.g., the hooks 14) can break during use and are exposed in an appearance of the main body 1 and the display 3, thus detracting from the appearance thereof. Further, the projected portions can catch or contact adjacent objects, the user or the like.

In addition, since the latch device 10 as a separate part is used for the selective engagement between the main body 1 and the display 3, the number of parts is relatively increased. Accordingly, there are additional disadvantages in that assembling processes are more complex and manufacturing costs are also increased.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a hinge assembly and method that is configured to engage between a main body and a display in a portable computer.

Another object of the present invention is to provide a portable computer that does not need a separate latch device.

Another object of the present invention is to provide a hinge assembly and method that is configured to urge first and second body units of a portable computer to maintain prescribed position.

Another object of the present invention is to provide a hinge assembly and method that is configured to move from a closed position resulting from movement in a single direction.

In order to achieve at least the above objects and advantages in a whole or in part, in accordance with one aspect of the present invention there is provided a hinge assembly that includes a first mounting bracket fixed to a first base portion, a first cam configured to move as the first mounting bracket moves, a second cam, wherein a surface thereof is configured to engage a corresponding surface of the first cam as the second cam rotates with respect to the first cam, a second mounting bracket fixed to a second base portion and configured to rotate with respect to the first base portion, a hinge shaft comprising a penetrating shaft portion configured to pass through the first cam, the second cam, and to extend into the second mounting bracket so as to form a center of rotation, and a latching groove provided on a surface of the first cam and configured to engage with a corresponding latching projection provided on a corresponding surface of the second cam, and to be disengaged by a force that exceeds a prescribed value.

To further achieve at least the above objects and advantages in a whole or in part, in accordance with one aspect of the present invention there is provided a portable computer that includes a main body, a display configured to be folded onto an end of the main body, and to be unfolded with respect thereto at a predetermined angle, and a hinge assembly configured to allow the main body and the display to rotate relative to one another, wherein the hinge assembly includes a first mounting bracket mounted to the main body and provided with a first cam, a second mounting bracket mounted to the display and provided with a second cam, wherein a surface of the second cam is configured to contact and to rub against a corresponding surface of the first cam as the second cam rotates with respect to the first cam, a hinge shaft comprising a penetrating shaft portion configured to pass through the first and second cams so as to form a center of rotation, a contact friction supplying portion configured to generate a contact frictional force between the first and second cams, and a latching groove configured to engage with a corresponding latching projection provided on corresponding surfaces of the first and second cams, respectively, and to be disengaged by a force that exceeds a predetermined value.

To further achieve at least the above objects and advantages in a whole or in part, in accordance with one aspect of the present invention there is provided a method of assembling a portable computer that includes coupling a first body portion and a second body portion together with a hinge to move between an open position and a closed position, providing a first conformal surface in the hinge configured to move with first body portion, providing a second conformal surface in the hinge to move with the second body portion, wherein the first and second conformal surfaces respectively have a corresponding projection and recess configured to engage each other to maintain the first and second body portions in the closed position.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF PREFERRED EMBODIMENTS

Embodiments of a hinge assembly according to the invention, a portable computer having the same and methods thereof will now be described with reference to the accompanying drawings.

Figure 1:
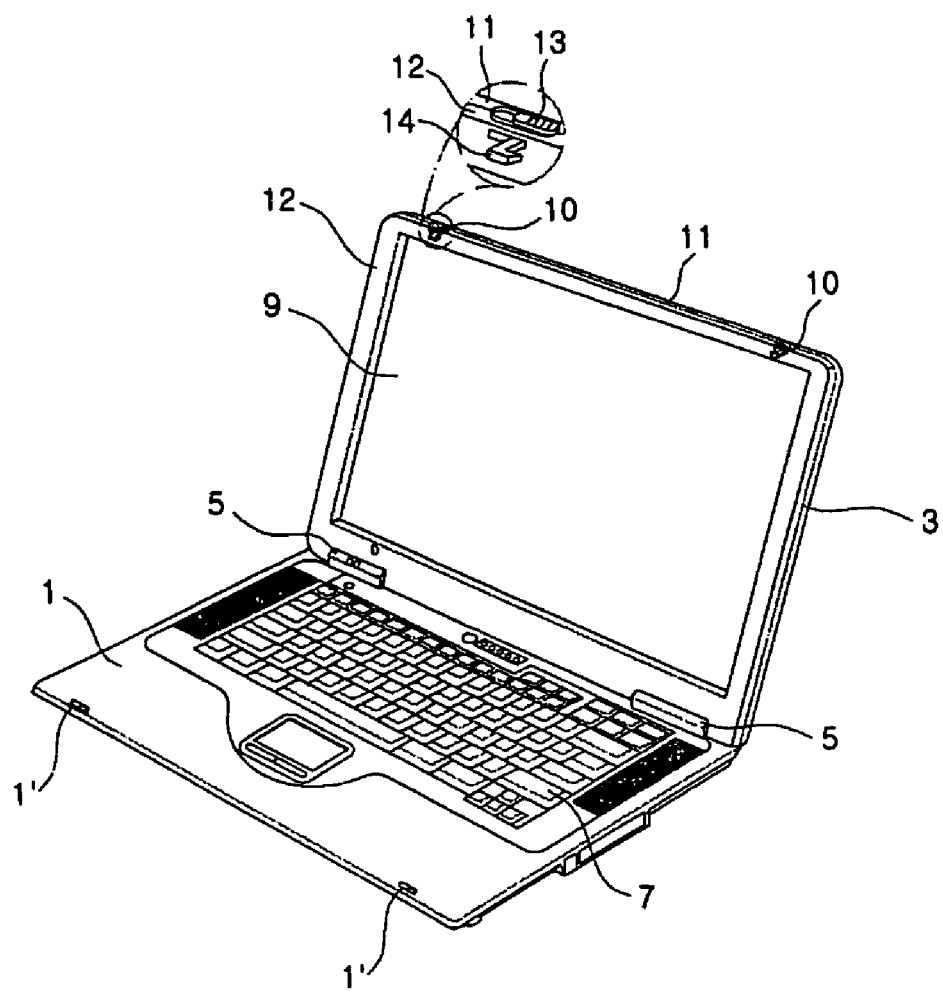
FIG. 1 is a diagram showing perspective view of a conventional portable computer.
Figure 2:
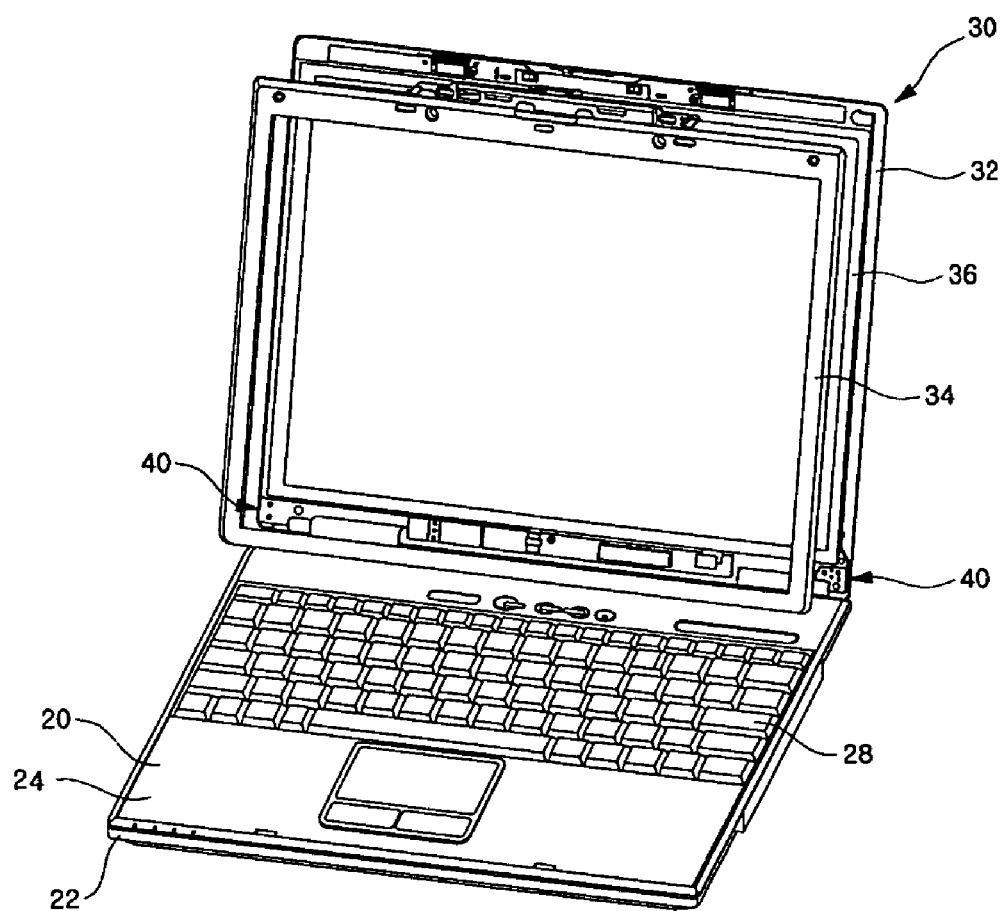
FIG. 2 is a diagram showing an exploded perspective view of a portable computer to which a hinge assembly in accordance with an embodiment of the invention is applied.
Figure 3:
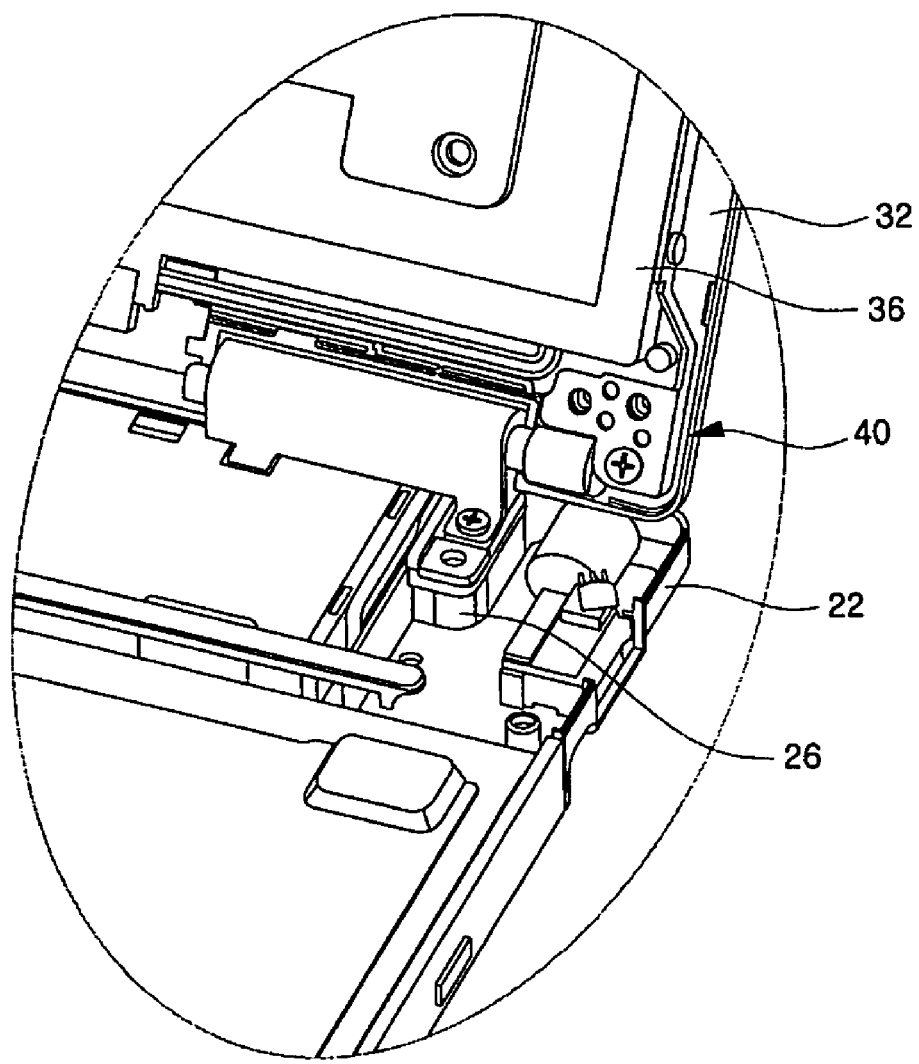
FIG. 3 is a diagram showing a perspective view of a portion of the hinge assembly of FIG. 2 in accordance with an embodiment of the invention.
Figure 4:
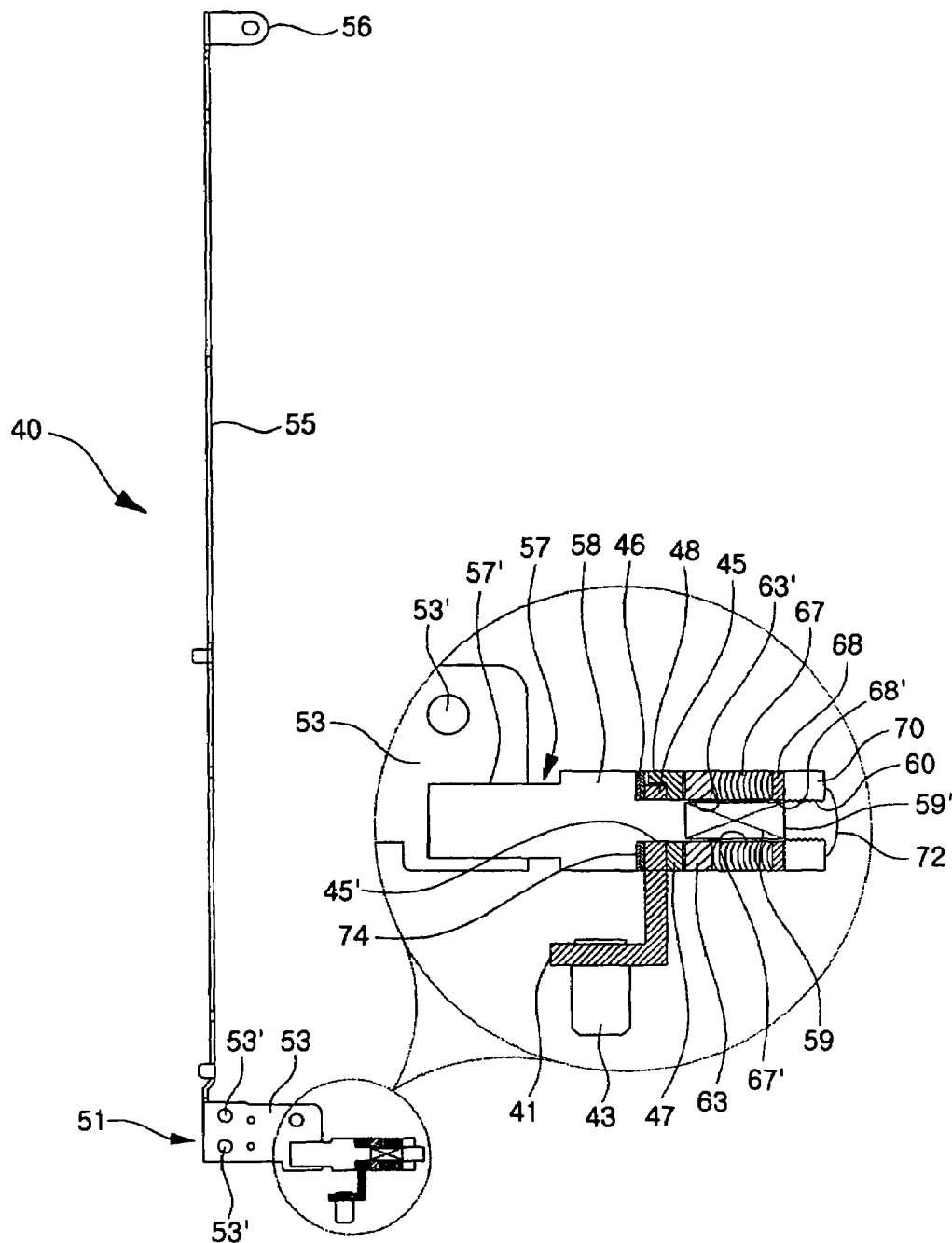
FIG. 4 is a diagram showing a partially sectional plan view of the hinge assembly of FIG. 2 in accordance with an embodiment of the invention.
Figure 5A:
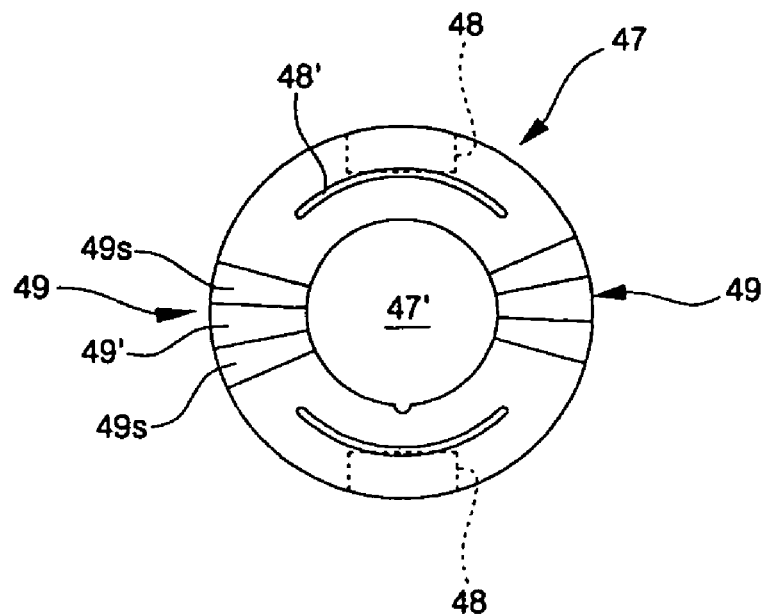
FIGS. 5a to 5c are diagrams showing front, side and plan views, respectively, of a first cam of the hinge assembly in accordance with an embodiment of the invention.
Figure 5B:
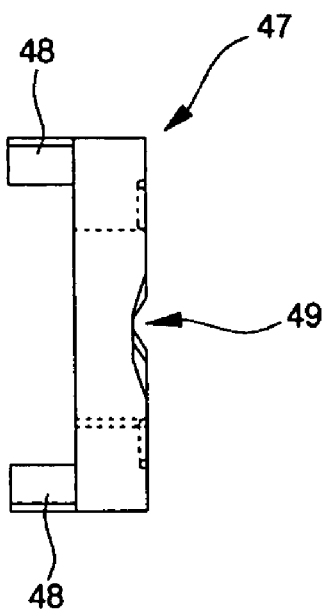
Figure 5C:
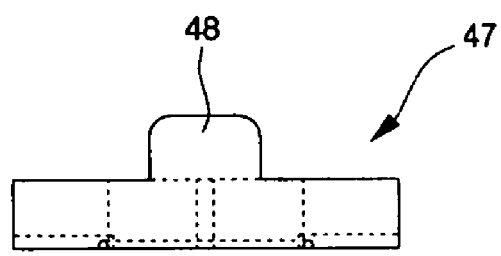
Figure 6A:
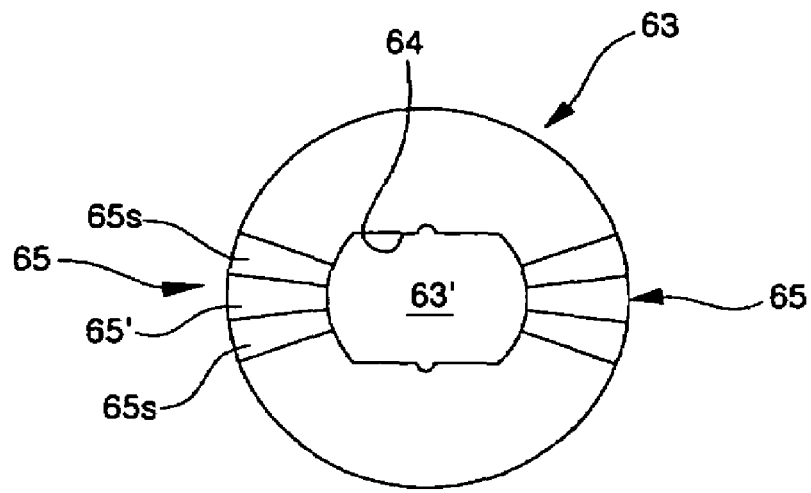
FIGS. 6a to 6c are diagrams showing front, side and plan views, respectively, of a second cam of the hinge assembly in accordance with an embodiment of the invention.
Figure 6B:
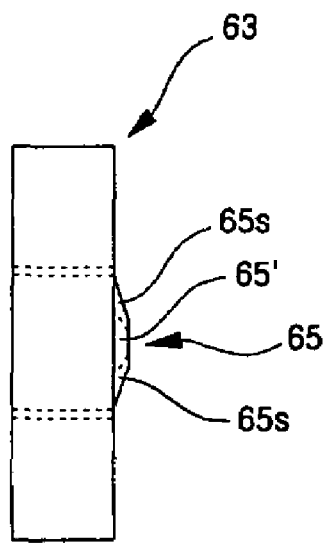
Figure 6C:
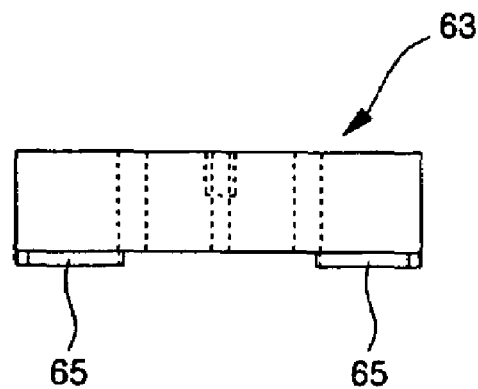

FIG. 2 is an exploded perspective view showing constitution of a portable computer to which an embodiment of a hinge assembly in accordance with the invention is applied. FIG. 3 is a perspective view of a portion of the embodiment shown in FIG. 2. FIG. 4 is a plan view showing the hinge assembly of the embodiment of the hinge assembly shown in FIG. 2. FIGS. 5a to 5c are front, side and plan views, respectively, of a first cam of the hinge assembly shown in FIG. 4. FIGS. 6a to 6c are front, side and plan views, respectively, of a second cam of the hinge assembly shown in FIG. 4.

As shown in FIGS. 2–4, a form or an appearance of a main body 20 of a portable computer can be made by a keyboard deck 24 and a bottom case 22. The bottom case 22 can form a part of bottom, front, rear and both side surfaces of the main body 20. The keyboard deck 24 can form a part of upper, front, rear and both side surfaces of the main body 20. However, the invention is not intended to be so limited. For example, the bottom case 22 and the keyboard deck 24 can form the bottom and upper surfaces respectively, while the front and rear surfaces and both side surfaces may be formed by various combination of the bottom case 22 and the keyboard deck 24. A keyboard 28 can be installed on the keyboard deck 24. Various parts of the portable computer such as a main board can be installed in the main body 20.

As shown in FIG. 3, a rear section in the main body 20 can include a hinge mounting stand 26. A first mounting bracket 41 of hinge assembly 40 can be fastened to the hinge mounting stand 26.

The display 30 or first body can be coupled to a rear end (e.g., selected portion) of the main body 20 through the hinge assembly 40. An appearance of the display 30 can include a screen, a rear case 32 and a front case 34. The rear case 32, which is preferably formed in a substantially rectangular plate, forms a rear face of the display 30. The front case 34, which forms an edge of a front face of the display 30, can seal an edge of a display screen such as liquid crystal panel 36 provided in the display 30. The liquid crystal panel 36 can display image information.

The hinge assembly 40 preferably allows the display 30 to pivot with respect to a portion of the main body 20. The hinge assembly 40 is preferably provided near both sides of the rear end the main body 20 and both corresponding ends of the display 30.

The hinge assembly 40 can include a portion mounted to the main body 20 and a portion mounted to the display 30. The first mounting bracket 41 can be coupled to the hinge mounting stand 26 provided at the bottom case 22 of the main body 20. The first mounting bracket 41 can include a fastening boss 43 fastened to the hinge mounting stand 26. The first mounting bracket 41 may be provided with separate fastening holes.

The first mounting bracket 41 can be provided with a cam connecting portion 45. The cam connecting portion 45, which is preferably formed in a corresponding or substantially circular disk shape, can be vertically projected on a portion of an upper face of the first mounting bracket 41. A through hole 45' (e.g., circular), through which a penetrating shaft portion 59 passes, can be formed through the center of the cam connecting portion 45.

A portion corresponding to a rim of the through hole 45' can include interlocking slots 46 at intervals (e.g., of 180 degrees). An interlocking projection 48 of a first cam 47, (e.g., seated in the interlocking slot 46), can cause the first cam 47 and the first mounting bracket 41 to be engaged. There may be provided one or more interlocking slots 46 and projections 48.

A through hole 47' (e.g., having a circular disk shape) can be formed through the center of the first cam 47. The penetrating shaft portion 59 can pass through the through hole 47'. Opposite ends of a surface of the first cam 47 are preferably provided with the interlocking projections 48 seated in the interlocking slots 46 of the cam connecting portion 45, respectively. In this embodiment, the same number, two (2), of interlocking projections 48 and interlocking slots 46 are formed.

Oil grooves 48' can be formed on the surface of the first cam 47 opposite the surface on which the interlocking projections 48 are provided. The oil grooves 48' can be formed with a prescribed shape (e.g., concavely formed in a circular arc shape having a predetermined curvature). However, the present invention is not intended to be so limited.

The oil grooves 48' are provided with oil for lubrication. In the present embodiment, two oil grooves 48' are symmetrically formed. The oil grooves 48' may be similarly formed on a second cam 63, which will be described below.

Latching grooves or recesses can be included in one of the first cam 47 and the second cam 63. Latching projections may be included in the other of the first cam 47 and the second cam 63.

As shown in FIGS. 5a to 5c, The latching grooves 49 can be on the surface of the first cam 47 on which the oil grooves 48' are formed. The latching grooves 49 can be formed at intervals (e.g., of 180 degrees). Each of the latching grooves 49 is preferably formed from an edge of the through hole 47' to an edge of the first cam 47. The latching groove 49 can be formed so that the width thereof linearly increases from the through hole 47' to the edge of the first cam 47. A seating surface 49' (e.g., planar) can be formed on the center of the latching groove 49 along the forming direction thereof with inclined surfaces 49s at both ends of the seating surface 49', respectively. However, the invention is not intended to be so limited. For example, the inner surfaces of the latching groove 49 may also be formed as a curved surface, non-linear surface or a stepped surface and the seating surface 49' can have a prescribed non-planar shape in another example of the latching groove 49. If the inner surfaces of the latching groove 49 is formed as a curved surface, its interlocking operation with a latching projection 65 may be performed more smoothly.

A second mounting bracket 51 can be coupled fixedly to the display 30. The second mounting bracket 51 can be fixed to the rear case 32 and the liquid crystal panel 36 of the display 30. The second mounting bracket 51 can include a body portion 53 fastened to the rear case 32. A plurality of fastening holes 53' or the like can be formed through the body portion 53. However, the present invention is not intended to be so limited.

A connecting bar 55 can be provided so that a first end thereof can be coupled to the body portion 53 and the length of the connecting bar 55 extends along and can be coupled to the liquid crystal panel 36. A front end of the connecting bar 55 is preferably provided with a front end fastening piece 56 to be fastened to the rear case 32 or the like. Fastening holes or the like can be formed through the connecting bar 55 and the front end fastening piece 56.

A hinge shaft 57 or projection can be provided at the body portion 53 of the second mounting bracket 51. The hinge shaft 57 does not rotate with respect to the body portion 53 and moves integrally therewith. The hinge shaft 57 can be installed by press-fitting a press-fitting portion 57', which is formed at a side thereof, into the body portion 53. A portion adjacent to the press-fitting portion 57' of the hinge shaft 57 can have a large diameter portion 58. The large diameter portion 58 preferably has relatively larger diameter than the other portions of the hinge shaft 57. However, the invention is not intended to be so limited. It is preferred that a diameter of the large diameter portion 58 be formed corresponding to the first and second cams 47 and 63.

The hinge shaft 57 can be formed with the penetrating shaft portion 59 to extend opposite to the press-fitting portion 57' from the large diameter portion 58 to pass through the through holes 45', 47' and 63' of the cam connecting portion 45, the first cam 47, and the second cam 63, respectively, and through holes 67' of friction disks 67. A diameter of penetrating shaft portion 59 is preferably smaller than that of the large diameter portion 58. Interlocking surfaces (e.g., flat surface 39') can be formed at opposite positions of side surfaces of the penetrating shaft portion 59.

The interlocking flat surfaces 59' are formed on portions of the penetrating shaft portion 59. A front end of the penetrating shaft portion 59 can include a thread portion 60 to be fastened with a nut 70, which will be described below, or the like.

The second cam 63 can be installed so as to be in contact with the first cam 47. Preferably, the second cam 63 is conformal to the first cam 47 having prescribed shapes and configuration. As shown in FIGS. 6a to 6c, the through hole 63' is formed through (e.g., the center of) the second cam 63. Linear portions 64 can be formed on both opposite predetermined sections of the through hole 63'. The linear portions 64 can be interconnected with the interlocking flat surfaces 59' of the penetrating shaft portion 59, which can cause the second cam 63 and the penetrating shaft portion 59 to integrally move.

The latching projections 65 can be projected from and formed on the second cam 63. The latching projections 65, which are formed on a surface in contact with the first cam 47, can be formed at positions corresponding to the latching grooves 49. An upper end of each latching projection 65 can include a flat top surface 65' and both ends or sides thereof having inclined surfaces 65s, respectively. The top surface 65' can correspond to the seating surface 49', while the inclined surfaces 65s can correspond to the inclined surfaces 49s. The latching projection 65 can also be formed such that the width thereof linearly increases from an edge of the through hole 63' to an outer edge of the second cam 63.

The latching grooves 49 and the latching projections 65 provided at the first cam 47 and the second cam 63, respectively, can function as a latch device for engaging the main body 20 and the display 30 to each other. To this end, when the display 30 is folded onto the main body 20, the latching projections 65 can be seated in the latching grooves 49 so that the cannot be rotated with respect to each other by a force below a predetermined value.

Further, when the main body 20 is fully unfolded by rotating at 180 degrees (e.g., a prescribed interval) from the state that the main body 20 is folded onto the display 30, the main body 20 and the display 30 can be engaged to each other so that they cannot be rotated with respect to each other by a force below a predetermined value.

Embodiments of a manufacturing method and material of cams according to the invention will now be described. In one embodiment, in order to reduce or minimize wear caused from contact friction between the cams 47 and 63, metal injection molding can be used with SUS 440C material. Thus, as compared with a conventional sintering method, surface roughness of the cam is improved and hardness thereof increases. For example, while the surface roughness is about 70 microns when the conventional sintering method is employed, and the surface roughness is about 7 microns, which is one tenth of the former, when the embodiment of the metal injection molding is employed.

The hardness is about 60 when the metal injection molding is employed, which may improve reliability. In case that a forming density of raw material is 100%, the forming density of the cam manufactured using the embodiment of the metal injection molding is 97%, which is high as compared with the forming density of 90% when the cam manufactured by the conventional sintering method.

Exemplary structures and methods configured to generate contact between the first and second cams or latching grooves and latching projections will now be described. However, the invention is not intended to be limited by such disclosure.

Exemplary structures can generate contact friction greater than a predetermined value by causing or urging close contact between the first cam 47 and the second cam 63. The contact friction between the first cam 47 and the second cam 63 generated by a structure can cause a relative rotation between the first cam 47 and the second cam 63 not to occur inadvertently.

Friction disks 67 or the like, which function to bring the first cam 47 and the second cam 63 into close contact with each other, can cause the hinge assembly 40 not to operate inadvertently. However, the present invention is not intended to be so limited, for example, elastic, springs or the like could be used instead of friction disks 67. For example, the friction disks 67 function to prevent the display 30 from inadvertently rotating with respect to the main body 20.

The through hole 67' through the center of the friction disk 67 can have a prescribed shape (e.g., circular disk shape). The through hole 67' may preferably have the same shape as the through hole 63' of the second cam 63, but not necessarily so. The friction disk 67 does not have a perfect flat shape and is preferably formed so as to generate an elastic force by elastic deformation when compressed. There can be a plurality of the friction disks 67.

A closing plate 68, which supports the friction disks 67 at a position opposite to the second cam 63, can be formed in a circular disk shape. A through hole 68' can be formed through the center of the closing plate 68. The closing plate 68 is preferably in close contact with the friction disk 67 using, for example, the nut 70 fastened to the thread portion 60 of the penetrating shaft portion 59. Thus, the frictional force between the cams 47 and 63 generated by the friction disks 67 may be controlled by the nut 70.

The front end of the penetrating shaft portion 59 can be provided with a looseness preventing portion 72 for reducing the likelihood or preventing the nut 70 from loosening. The looseness preventing portion 72 can be formed by plastic deformation of the front end of the penetrating shaft portion 59, for example, by striking it after tightening the nut 70.

A washer 74 can be provided between the large diameter portion 58 and the cam connecting portion 45. The washer 74 can make the rotation between the large diameter portion 58 and the cam connection portion 45 smoother.

An embodiment of a method for operating a hinge assembly according to the invention and the portable computer having the same will now be described. The embodiment of the method for operating the hinge assembly can be applied to and described using the embodiment of a hinge assembly shown in FIGS. 3–6c. However, the invention is not intended to be so limited by such disclosure.

The embodiment of the hinge device 40 is preferably provided at each of both the sides of the rear end of the main body 20 and each of both the ends of the display 30. The hinge devices 40 provided at both the ends may be constructed so that the constitutional elements of the respective hinge devices are arranged opposite (e.g., symmetrically) to each other. For example, the body portions 53 of the respective second mounting brackets 51 can be arranged relatively outside as compared with the respective nuts 70, which are arranged relatively inside. In addition, the respective first mounting brackets 41 can be oriented to be directed from a rear end toward a front end of the bottom case 22.

The first mounting bracket 41 fixed to the bottom case 22, and the first cam 47 and the cam connecting portion 45 of the first mounting bracket 41 can be integrated or engaged with each other. Thus, in operations to rotate the display 30 with respect to the main body 20, the first mounting bracket 41 and the first cam 47 can be relatively stationary, the hinge shaft 57 rotate relatively with respect thereto.

In rotation operations, the second cam 63, the friction disks 67, the closing plate 68, the nut 70, the hinge shaft 57 and the second mounting bracket 51 can integrally move. In this case, they move along with the display 30.

For example, the first cam 47 connected to the cam connecting portion 45 may be positioned on a side of the friction disks 67 and the second cam 63 may be positioned on a side of the large diameter portion 58. In such a case, it is preferred that the friction disks 67 be constructed to move integrally with the first cam 47.

Further, during rotation operations, when the display 30 rotates with respect to the main body 20, the first cam 47 and the second cam 63 rotate with respect to each other while being in contact with and rubbed against each other. When the first cam 47 and the second cam 63 are in contact with each other and then rotate with respect to each other, the frictional force generated therefrom is in connection with or can have a prescribed relationship to the elastic force generated from the friction disks 67. Of course, frictional surfaces between the first cam 47 and the second cam 63 are preferably supplied with the oil provided at the oil grooves 48', which can reduce or prevent wear of the cams.

Since the first cam 47 and the second cam 63 are in contact with and rubbed against each other, if a force below the predetermined value is applied to the display 30, they do not rotate relatively with respect to each other. For example, such a structure can cause the display 30 not to inadvertently rotate with respect to the main body 20, for example, because of self weight of the display 30.

In the embodiment of the method of operating the latching hinge device, when the display 30 is seated and folded onto the main body 20, the latching projections 65 of the second cam 63 can be seated (e.g., conformal) in the latching grooves 49 of the first cam 47. Accordingly, for a user to unfold the display 30 with respect to the main body 20, a force over a predetermined value is necessary. This means that the display 30 is not inadvertently unfolded with respect to the main body 20 when the display 30 is folded onto the main body 20 (e.g., closed).

For smoother operations of the embodiment of the method, transition surfaces slidingly couple a highest projection (or lowest recess) of the latching projections and/or grooves. For example, the latching grooves 49 and the latching projections 65 include the inclined surfaces 49s and 65s, respectively. Therefore, the latching projections 65 can be prevented from suddenly entering or coming out of the latching grooves 49. Accordingly, the hinge assembly 40 can operate with increased reliability. Alternatively, if the latching grooves 49 and the latching projections 65 are generally formed in a curved surface or the like, the smooth operation of the hinge assembly can also be obtained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments of a hinge assembly and a portable computer having the same and methods thereof have various advantages. In embodiments of the invention, when a display is folded onto a main body, the display and the main body are engaged to each other by forming latching grooves and latching projections on the corresponding surfaces (e.g., of cams) of the hinge assembly, which frictionally engage each other. Accordingly, a separate latch device may not be necessary and latch devices can be removed. Thus, the number of parts of a portable computer can be reduced, an assembling process thereof can be simplified, manufacturing costs can be reduced, accidental entanglements can be reduced or part breakage can be reduced.

In addition, when the latching grooves and the latching projections are formed with the inclined surfaces (e.g., curved surfaces), the engagement and separation of the latching grooves and the latching projections is smoothly effected, which can increase reliability.

Further, since the cams that are rubbed against each other are manufactured using the material having high hardness using the metal injection molding, the surface roughness and wear resistance thereof can be increased. In addition, the forming density is close to that of raw material when the metal injection molding is employed, which can show a superior property.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A hinge assembly, comprising:
   a first mounting bracket fixed to a first base portion;
   a first cam configured to move as the first mounting bracket moves;
   a second cam, wherein a surface thereof is configured to engage a corresponding surface of the first cam as the second cam rotates with respect to the first cam;
   a second mounting bracket fixed to a second base portion and configured to rotate with respect to the first base portion;
   a hinge shaft comprising a penetrating shaft portion configured to pass through the first cam, the second cam, and to extend into the second mounting bracket so as to form a center of rotation; and
   a latching groove provided on a surface of the first cam and configured to engage with a corresponding latching projection provided on a corresponding surface of the second cam, and to be disengaged by a force that exceeds a prescribed value.

2. The hinge assembly as claimed in claim 1, wherein the penetrating shaft portion is press fit into the second mounting bracket.

3. The hinge assembly as claimed in claim 1, wherein the first mounting bracket comprises a cam connecting portion configured to engage with the first cam.

4. The hinge assembly as claimed in claim 3, wherein the penetrating shaft portion of the hinge shaft is configured to pass through the cam connecting portion.

5. The hinge assembly as claimed in claim 3, wherein the cam connecting portion comprises at least one interlocking slot, and wherein the first cam comprises at least one corresponding interlocking projection configured to be seated in the interlocking slot.

6. The hinge assembly as claimed in claim 3, wherein the hinge shaft further comprises a large diameter portion with a larger diameter than that of the penetrating shaft portion, wherein a surface of the large diameter portion of the hinge shaft and the cam connecting portion of the first mounting bracket are positioned with a washer interposed therebetween.

7. The hinge assembly as claimed in claim 1, comprising a contact friction supplying portion configured to generate a contact frictional force between the first and second cams.

8. The hinge assembly as claimed in claim 7, wherein the contact friction supplying portion comprises:
   a friction disk configured to contact one of the first and second cams and to elastically deform so as to provide an elastic force between the first and second cams; and
   a nut fastened to the penetrating shaft portion and configured to control a degree of contact between the friction disk and the one of the first and second cams.

9. The hinge assembly as claimed in claim 8, further comprising a closing plate provided between the friction disk and the nut, wherein the closing plate, the friction disk and the nut are configured to operate integrally with the hinge shaft.

10. The hinge assembly as claimed in claim 9, further comprising a looseness preventing portion provided at an end of the penetrating shaft portion and configure to prevent a loosening of the nut.

11. The hinge assembly as claimed in claim 10, wherein the loosening preventing portion is formed after a tightening of the nut.

12. The hinge assembly as claimed in claim 1, wherein the latching groove and the latching projection are conformally formed on engaged surfaces of the first and second cams, respectively.

13. The hinge assembly as claimed in claim 12, wherein each of the latching groove and the latching projection is formed such that a width thereof gradually increases from a center to an edge of the corresponding cam, and side surfaces thereof are formed as inclined surfaces.

14. The hinge assembly as claimed in claim 12, wherein each of the latching groove and the latching projection is formed from a center to an edge of the corresponding cam, and a surface thereof is formed as a curved surface.

15. The hinge assembly as claimed in claim 12, further comprising an oil groove formed in the engaged surface of one of the first or second cams and configured to provide lubrication oil between the first and second cams.

16. The hinge assembly as claimed in claim 12, wherein the first and second cams are manufactured by metal injection molding out of SUS 440C material.

17. A portable computer comprising the hinge assembly of claim 1.

18. A portable computer, comprising:
   a main body;
   a display configured to be folded onto an end of the main body, and to be unfolded with respect thereto at a predetermined angle; and a hinge assembly configured to allow the main body and the display to rotate relative to one another, wherein the hinge assembly comprises:
- a first mounting bracket mounted to the main body and provided with a first cam;
- a second mounting bracket mounted to the display and provided with a second cam, wherein a surface of the second cam is configured to contact and to rub against a corresponding surface of the first cam as the second cam rotates with respect to the first cam;
- a hinge shaft comprising a penetrating shaft portion configured to pass through the first and second cams so as to form a center of rotation;
- a contact friction supplying portion configured to generate a contact frictional force between the first and second cams; and
- a latching groove configured to engage with a corresponding latching projection provided on corresponding surfaces of the first and second cams, respectively, and to be disengaged by a force that exceeds a predetermined value.

19. The portable computer as claimed in claim 18, the contact friction supplying portion comprises:
- a friction disk configured to contact one of the first and second cams and to elastically deform so as to provide an elastic force between the first and second cams; and
- a nut fastened to the penetrating shaft portion and configured to control a degree of contact between the friction disk and the one of the first and second cams.

20. The portable computer as claimed in claim 19, further comprising a closing plate provided between the friction disk and the nut, wherein the closing plate, the friction disk and the nut are configured to operate integrally with the hinge shaft.

21. The portable computer as claimed in claim 20, further comprising a looseness preventing portion provided at an end of the penetrating shaft portion and configured to prevent a loosening of the nut, and wherein the looseness preventing portion is formed after a tightening of the nut.

22. The portable computer as claimed in claim 18, wherein the latching groove and the latching projection are formed on engaged surfaces of the first and second cams, respectively, and wherein each of the latching groove and the latching projection is formed such that a width thereof gradually increases toward an outer edge of the corresponding cam, side surfaces thereof are formed as inclined surfaces and a middle surface between the side surfaces is substantially flat.

23. The portable computer as claimed in claim 18, wherein each of the latching groove and the latching projection has sloped side surfaces and a substantially flat a middle surface between the side surfaces.

24. The portable computer as claimed in claim 18, wherein the latching groove and the latching projection are formed on engaged surfaces of the first and second cams, respectively, and wherein each of the latching groove and the latching projection is formed from a center to an edge of the corresponding cam, and side surfaces thereof are formed as a curved surface.

* * * * *

(12) EX PARTE REEXAMINATION CERTIFICATE (9973rd)
United States Patent
Kim

(10) Number: US 7,187,539 C1
(45) Certificate Issued: Dec. 9, 2013

(54) HINGE ASSEMBLY IN PORTABLE COMPUTER

(75) Inventor: Jun-Hong Kim, Hwaseong (KR)

(73) Assignee: LG Electronics Inc., Yoido-Dong, Youngdungpo-Gu, Seoul (KR)

Reexamination Request:
No. 90/012,510, Sep. 12, 2012

Reexamination Certificate for:
Patent No.: 7,187,539
Issued: Mar. 6, 2007
Appl. No.: 10/970,012
Filed: Oct. 22, 2004

(30) Foreign Application Priority Data

Jun. 30, 2004 (KR) .................. 10-2004-0050735

(51) Int. Cl.
*G06F 1/16* (2006.01)
*E05C 17/64* (2006.01)

(52) U.S. Cl.
USPC ............... 361/679.27; 361/679.58; 16/319; 16/342

(58) Field of Classification Search
None
See application file for complete search history.

(56) References Cited

To view the complete listing of prior art documents cited during the proceeding for Reexamination Control Number 90/012,510, please refer to the USPTO's public Patent Application Information Retrieval (PAIR) system under the Display References tab.

*Primary Examiner* — Margaret Rubin

(57) ABSTRACT

A hinge assembly, a portable computer having the same and methods thereof can include a latching function. The hinge assembly includes a latching projection and latching groove coupled, respectively, to a main unit and a display unit of a portable computer. The latching projection and latching groove can slidingly engage with each other to hold the portable computer in a prescribed position (e.g., closed) unless a force greater than a prescribed force is applied. The hinge assembly includes a first mounting bracket; a first cam moving integrally with the first mounting bracket; a second mounting bracket fixed to a portion that can rotate relatively to the portion to which the first mounting bracket is fixed; and a second cam coupled to the second mounting bracket that rotates relatively with respect to the first cam while being in contact with and rubbed against the first cam. Thus, it is not necessary to separately provide a latch device for engagement between the display and the main body.

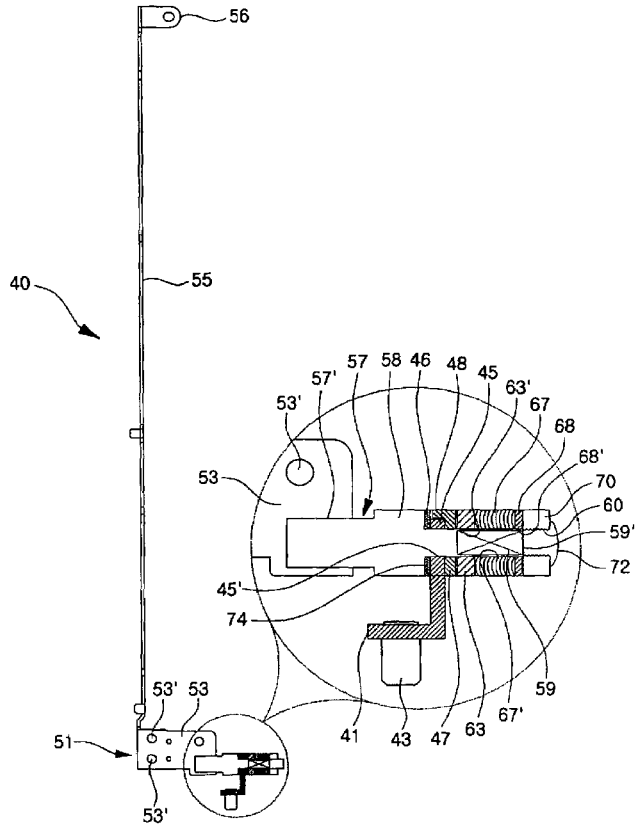

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 10 and 21 are cancelled.

Claims 1, 8, 11, 18 and 19 are determined to be patentable as amended.

Claims 2-7, 9, 12-17, 20, 22, 23 and 24, dependent on an amended claim, are determined to be patentable.

1. A hinge assembly, comprising:
   a first mounting bracket fixed to a first base portion;
   a first cam configured to move as the first mounting bracket moves;
   a second cam, wherein a surface thereof is configured to engage a corresponding surface of the first cam as the second cam rotates with respect to the first cam;
   a second mounting bracket fixed to a second base portion and configured to rotate with respect to the first base portion;
   a hinge shaft comprising a penetrating shaft portion configured to pass through the first cam, the second cam, and to extend into the second mounting bracket so as to form a center of rotation; [and]
   a latching groove provided on a surface of the first cam and configured to engage with a corresponding latching projection provided on a corresponding surface of the second cam, and to be disengaged by a force that exceeds a prescribed value; *and*
   *a looseness preventing portion provided at an end of the penetrating shaft portion and configured to prevent a loosening of a nut.*

8. The hinge assembly as claimed in claim 7, wherein the contact friction supplying portion comprises:
   a friction disk configured to contact one of the first and second cams and to elastically deform so as to provide an elastic force between the first and second cams; and
   [a] *the* nut, *which is* fastened to the penetrating shaft portion and configured to control a degree of contact between the friction disk and the one of the first and second cams.

11. The hinge assembly as claimed in claim [10] *1*, wherein the loosening preventing portion is formed after a tightening of the nut.

18. A portable computer, comprising:
    a main body;
    a display configured to be folded onto an end of the main body, and to be unfolded with respect thereto at a predetermined angle; and
    a hinge assembly configured to allow the main body and the display to rotate relative to one another, wherein the hinge assembly comprises:
       a first mounting bracket mounted to the main body and provided with a first cam;
       a second mounting bracket mounted to the display and provided with a second cam, wherein a surface of the second cam is configured to contact and to rub against a corresponding surface of the first cam as the second cam rotates with respect to the first cam;
       a hinge shaft comprising a penetrating shaft portion configured to pass through the first and second cams so as to form a center of rotation;
       a contact friction supplying portion configured to generate a contact frictional force between the first and second cams; [and]
       a latching groove configured to engage with a corresponding latching projection provided on corresponding surfaces of the first and second cams, respectively, and to be disengaged by a force that exceeds a predetermined value; *and*
       *a looseness preventing portion provided at an end of the penetrating shaft portion and configured to prevent a loosening of a nut, and wherein the loosening preventing portion is formed after a tightening of the nut.*

19. The portable computer as claimed in claim 18, the contact friction supplying portion comprises:
    a friction disc configured to contact one of the first and second cans and to elastically deform as to provide an elastic force between the first and second cams; and
    [a] *the* nut, *which is* fastened to the penetrating shaft portion and configured to control a degree of contact between the friction disk and the one of the first and second cams.

\* \* \* \* \*